US011310210B2

(12) United States Patent
Bodziony et al.

(10) Patent No.: US 11,310,210 B2
(45) Date of Patent: Apr. 19, 2022

(54) APPLYING UNIFIED GOVERNANCE AND INTEGRATION PLATFORM TO SOCIAL MEDIA DATA

(71) Applicant: International Business Machines Corporation, Armonk, NY (US)

(72) Inventors: Michal Bodziony, Tęgoborze (PL); Grzegorz Piotr Szczepanik, Cracow (PL); Lukasz Jakub Palus, Cracow (PL); Krzysztof Rudek, Nowy Wisnicz (PL)

(73) Assignee: International Business Machines Corporation, Armonk, NY (US)

(*) Notice: Subject to any disclaimer, the term of this patent is extended or adjusted under 35 U.S.C. 154(b) by 350 days.

(21) Appl. No.: 16/745,752

(22) Filed: Jan. 17, 2020

(65) Prior Publication Data

US 2021/0226925 A1 Jul. 22, 2021

(51) Int. Cl.
*H04L 29/06* (2006.01)
*G06Q 50/00* (2012.01)
(Continued)

(52) U.S. Cl.
CPC ...... *H04L 63/0428* (2013.01); *G06F 16/9035* (2019.01); *G06F 21/6245* (2013.01);
(Continued)

(58) Field of Classification Search
CPC . G06F 16/9035; G06F 21/6245; G06Q 50/01; H04L 63/0428; H04L 63/20; H04W 12/02; H04W 12/03; H04W 12/37
See application file for complete search history.

(56) References Cited

U.S. PATENT DOCUMENTS

| | | | | |
|---|---|---|---|---|
| 9,619,834 | B2 * | 4/2017 | Tedjamulia | G06Q 30/0641 |
| 10,642,870 | B2 * | 5/2020 | Malhotra | G06F 40/186 |

(Continued)

OTHER PUBLICATIONS

Sikka et al., "Deep Unified Multimodal Embeddings for Understanding both Content and Users in Social Media Networks", Retrieved From https://arxiv.org/pdf/1905.07075.pdf, Published May 2019 (Year: 2019).*

(Continued)

*Primary Examiner* — Chau Le
(74) *Attorney, Agent, or Firm* — Robert A. Voigt, Jr.; Shackelford, Bowen, McKinley & Norton, LLP

(57) ABSTRACT

A computer-implemented method, system and computer program product for applying a unified governance and integration platform to social media data. Data integration definitions for managing and protecting social media data are received. After receiving the data integration definitions for social media data, data integration externalization, governance catalog externalization or lineage externalization may be performed. For example, social media data may be extracted from a database system by a governance and integration unit ("unit") using the data integration definitions. The extracted social media data is then transformed and loaded to the social media data system via a connector linking the data from the unit to the social media data system. In another example, social media data is extracted from the social media data system by the unit, such as via the connector, using the data integration definitions and then transformed and loaded to the database system for analysis.

20 Claims, 6 Drawing Sheets

500

501 502 503 504

(51) Int. Cl.
*H04W 12/02* (2009.01)
*G06F 16/9035* (2019.01)
*G06F 21/62* (2013.01)
*H04W 12/03* (2021.01)
*H04W 12/37* (2021.01)

(52) U.S. Cl.
CPC ............. *G06Q 50/01* (2013.01); *H04L 63/20* (2013.01); *H04W 12/02* (2013.01); *H04W 12/03* (2021.01); *H04W 12/37* (2021.01)

(56) References Cited

U.S. PATENT DOCUMENTS

| | | | | |
|---|---|---|---|---|
| 2004/0122704 | A1* | 6/2004 | Sabol | G07C 9/37 706/45 |
| 2013/0097159 | A1* | 4/2013 | Park | G06Q 50/01 707/723 |
| 2016/0196511 | A1 | 7/2016 | Anisingaraju et al. | |
| 2016/0234147 | A1* | 8/2016 | Joel | H04W 4/60 |
| 2018/0349502 | A1* | 12/2018 | Maycock | G06F 16/24578 |
| 2019/0213332 | A1 | 7/2019 | McCoy et al. | |
| 2020/0285683 | A1* | 9/2020 | David | G06F 40/30 |

OTHER PUBLICATIONS

David Stodder, “Improving Data Preparation for Business Analytics,” Best Practices Report, Q3, WDP Matters—Transforming Data with Intelligence, 2016, pp. 1-38.

* cited by examiner

APPLYING UNIFIED GOVERNANCE AND INTEGRATION PLATFORM TO SOCIAL MEDIA DATA

TECHNICAL FIELD

The present invention relates generally to a unified governance and integration platform, and more particularly to applying a unified governance and integration platform to social media data.

BACKGROUND

The unified governance and integration platform are the bringing together of solutions that enables one to know if their data is correct and available to every data user as well as to trust that the data is delivered efficiently and is in compliance to data quality and privacy regulations (e.g., General Data Protection Regulation (GDPR)).

SUMMARY

In one embodiment of the present invention, a computer-implemented method for applying a unified governance and integration platform to social media data comprises receiving data integration definitions for managing and protecting social media data. The method further comprises extracting a first set of social media data in a database system using the data integration definitions. The method additionally comprises transforming the first set of extracted social media data into a format suitable for a social media data system. Furthermore, the method comprises loading the transformed first set of social media data to the social media data system via a connector linking data to the social media data system. Additionally, the method comprises extracting a second set of social media data from the social media data system using the data integration definitions via the connector. In addition, the method comprises transforming the second set of extracted social media data into a format suitable for the database system. The method further comprises loading the transformed second set of social media data to the database system.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
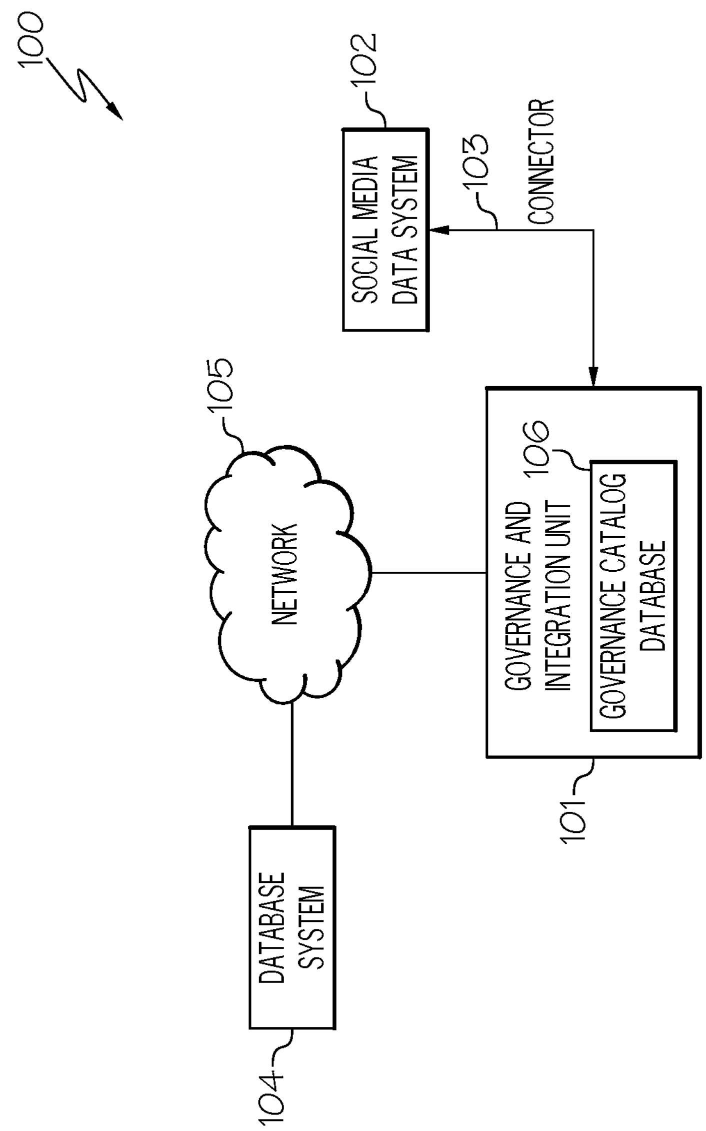
FIG. 1 illustrates a communication system for practicing the principles of the present invention in accordance with an embodiment of the present invention.

As stated in the Background section, the unified governance and integration platform are the bringing together of solutions that enables one to know if their data is correct and available to every data user as well as to trust that the data is delivered efficiently and is in compliance to data quality and privacy regulations (e.g., General Data Protection Regulation (GDPR)).

"Governance," as used herein, refers to the monitor, measure and management of data. For example, governance introduces practices that optimize the value of data, clarifies the ownership of data and enables businesses to make better decisions based on the data. A unified governance strategy helps bring order to both structured and unstructured data by delivering governed information to the business.

"Integration," as used herein, refers to the combination of systems, software, etc. that utilize the data.

Currently, social media data (data from social networks) can be governed if the social media data is already represented in the form of files. However, not all aspects of social media data are currently governed, such as via a unified governance and integration platform. For example, the process of publishing posts based on analytics or importing data from a profile is beyond the current unified governance and integration tools. Hence, data governance which promises to provide a holistic view on all the data assets is not currently available for social media data.

As a result, one is not able to know if the social media data is correct and available to every data user as well as to trust that the social media data is delivered efficiently and protected via a unified governance and integration platform.

The embodiments of the present invention provide a means for applying a unified governance and integration platform to social media data thereby enabling one to know if the social media data is correct and available to every data user as well as to trust that the social media data is delivered efficiently and protected as discussed further below.

In some embodiments, the present invention comprises a computer-implemented method, system and computer program product for applying a unified governance and integration platform to social media data. In one embodiment of the present invention, data integration definitions for managing and protecting social media data are received. "Data integration definitions," as used herein, refer to the rules for extracting, retrieving and loading social media data using connectors between systems. For example, data integration definitions are used to define which company profile is to be used for importing social media data into a social media data system. Furthermore, data integration definitions, as used herein, refer to the rules for recording and looking up social media data. Such data integration definitions are used to minimize risks, establish internal rules for data use, implement compliance requirements, improve internal and external communication, increase the value of data, etc. After receiving the data integration definitions for social media data, data integration externalization, governance catalog externalization or lineage externalization may be performed. For example, the social media data may be extracted from a database system by a governance and integration unit using the data integration definitions. The extracted social media data is then transformed and loaded to the social media data system via a connector linking the data from the governance and integration unit to the social media data system. In another example, social media data is extracted from the social media data system, such as via the connector, using the data integration definitions by the governance and integration unit. The extracted social media data is then transformed and loaded to the database system for analysis. In this manner, a unified governance and integration platform is applied to social media data thereby enabling one to know if the social media data is correct and available to every data user as well as to trust that the social media data is delivered efficiently and protected.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 for applying a unified governance and integration platform to social media data in accordance with an embodiment of the present invention. In one embodiment, system 100 includes a governance and integration unit 101 connected to a social media data system 102 via a connector 103. Furthermore, as illustrated in FIG. 1, governance and integration unit 101 is connected to a database system 104 via a network 105.

In one embodiment, social media data system 102 includes a web server(s) configured to offer a social networking and/or microblogging service thereby enabling users of computing devices to send and read other users' posts. "Posts," as used herein, include any one or more of the following: text (e.g., comments, sub-comments and replies), audio, video images, etc. Social media data system 102 is further configured to enable various collaborative activities, such as online discussion sites (e.g., public forums). While FIG. 1 illustrates a single social media data system 102, it is noted for clarity that any number of social media data systems 102 may be used to implement the social networking and/or microblogging services.

Governance and integration unit 101 is configured to apply a unified governance and integration platform to social media data. "Social media data," as used herein, refers to information that is collected from social media platforms. Such information includes how users view, share and engage with content or profiles. In one embodiment, governance and integration unit 101 collects such information by extracting posts made by users on designated social media data systems 102 (e.g., Facebook®, Twitter®, Instagram®, YouTube®, Google+®). For example, governance and integration unit 101 may monitor the social media data feeds from social media data systems 102 and then collect such posted social media data. In one embodiment, such collected information incudes metadata. "Metadata," as used herein, refers to data that describes the social media data, such as information about a website and its content. In another example, metadata may include the time of a user posting the social media content or the name of the user posting the social media content.

In one embodiment, such collected social media data is stored in a governance catalog database 106 in governance and integration unit 101. "Governance catalog database 106," as used herein, refers to a data structure storing dedicated asset types of social media data, such as page, post, article, endorsement, comment, reaction (e.g., like, +, etc.) and shares, along with its associated social media data. That is, social media data is a data source in governance catalog database 106 assigned one of the following asset types: page, post, article, endorsement, comment, reaction and shares. In one embodiment, governance catalog database 106 stores both the posted social media data as well as the associated social media metadata.

Furthermore, governance and integration unit 101 is configured to monitor, measure and manage data, such as social media data. Governance and integration unit 101 enables social media data to be governed in a manner that allows social media data to be extracted from one system and imported to another system via data integration definitions. For example, social media data may now be imported from a profile or published based on analytics via data integration definitions. "Data integration definitions," as used herein, refers to the rules for extracting, retrieving and loading social media data using connectors between systems. For example, data integration definitions are used to define which company profile is to be used for importing social media data into a social media data system. Furthermore, data integration definitions, as used herein, refer to the rules for recording and looking up social media data. Such data integration definitions are used to minimize risks, establish internal rules for data use, implement compliance requirements, improve internal and external communication, increase the value of data, etc. In one embodiment, privacy laws (e.g., General Data Protection Regulation (GDPR)) may be applied as data integration definitions to the social media data for extraction/applying. A hardware configuration of governance and integration unit 101 is provided below in connection with FIG. 2.

Additionally, as shown in FIG. 1, governance and integration unit 101 is connected to database system 104 via network 105. In one embodiment, database system 104 includes a database, a database management system and associated applications. Such a database may be used for storing the social media data, such as the content of the posts, images, comments, etc.

Network 105 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

As previously discussed, not all aspects of social media data are currently governed, such as via a unified governance and integration platform. For example, the process of publishing posts based on analytics or importing data from a profile is beyond the current unified governance and integration tools. In one embodiment, social media data is able to be governed via a unified governance and integration platform through the use of connectors, such as connector 103, that links data from social media data system 102 to governance and integration unit 101. Connectors are used to abstract away the technical details of a specific data store, application programming interface (API), protocol or transport, providing a common methodology for accessing diverse technologies and platforms. Unlike other components, connectors can perform different tasks based on their mode setting (for example, iterate, delete, and lookup). In one embodiment, modes are provided by the AssemblyLine component part of the connector. However, the list of modes supported is dependent on the connector interface. In one embodiment, the connector interface is utilized by governance and integration unit 101 to implement the actual logic for connector 103 to perform various functions, such as metadata retrieval, data extracting, data locating, lineage recording and data lookup.

In one embodiment, connector 103 may be used in either direction. For example, connector 103 may be used for applying selected data from database system 104 to social media data system 102, or used for selecting data in social media data system 102 to be extracted to database system 104 for analysis.

In one embodiment, system 100 includes multiple connectors 103, including having a unique connector for each social media data system 102 due to the structure of the data in social media data systems 102. In one embodiment, such connectors 103 can be treated as special data types that can only be dereferenced or compared for equality.

In one embodiment, connector 103, in the case of data integration, is responsible for metadata retrieval, data extracting, data locating, lineage recording and data lookup. That is, connector 103 is configured to retrieve metadata, extract data, load data, record lineage and lookup data. In one embodiment, such aspects can be implemented in reference to social media data via application programming interfaces (APIs), such as https://developers.facebook.com; https://dev.twitter.com/rest/public; https://developer.linkdin.com/docs; and http://developers.pinterest.com.

In one embodiment, connection to such APIs may be accomplished via the user providing a username and password credentials. Other examples include two-factor authentication, tokens or OAuth. In one embodiment, such authentication methods can be generalized in order to have one connector linked to all the social media data.

In one embodiment, such connectors 103 may be utilized by governance and integration unit 101 via IBM® DataStage® flow designer.

System 100 is not to be limited in scope to any one particular network architecture. System 100 may include any number of governance and integration units 101, social media data systems 102, connectors 103, database systems 104 and networks 105.

Furthermore, while FIG. 1 illustrates an on-premise deployment of the present invention, the principles of the present invention are not to be limited in such a manner. For example, the present invention may be deployed in the cloud (e.g., public cloud, hybrid cloud, private cloud).

Figure 2:
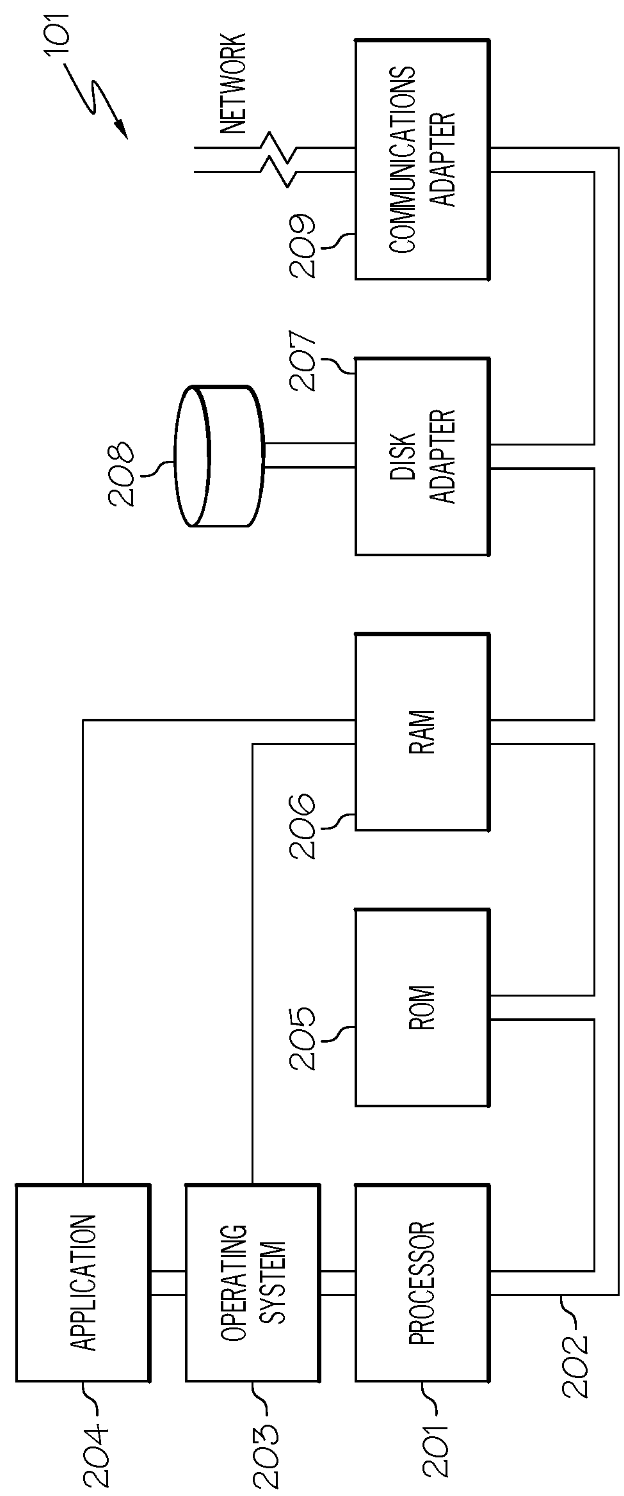
FIG. 2 illustrates an embodiment of the present invention of a hardware configuration of the governance and integration unit which is representative of a hardware environment for practicing the present invention.

Referring now to FIG. 2, FIG. 2 illustrates an embodiment of the present invention of the hardware configuration of governance and integration unit 101 (FIG. 1) which is representative of a hardware environment for practicing the present invention.

Governance and integration unit 101 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for applying a unified governance and integration platform to social media data as discussed further below in connection with FIGS. 3-8.

Referring again to FIG. 2, read-only memory ("ROM") 205 is connected to system bus 202 and includes a basic input/output system ("BIOS") that controls certain basic functions of governance and integration unit 101. Random access memory ("RAM") 206 and disk adapter 207 are also connected to system bus 202. It should be noted that software components including operating system 203 and application 204 may be loaded into RAM 206, which may be governance and integration unit's 101 main memory for execution. Disk adapter 207 may be an integrated drive electronics ("IDE") adapter that communicates with a disk unit 208, e.g., disk drive. It is noted that the program for applying a unified governance and integration platform to social media data, as discussed further below in connection with FIGS. 3-8, may reside in disk unit 208 or in application 204.

Governance and integration unit 101 may further include a communications adapter 209 connected to bus 202. Communications adapter 209 interconnects bus 202 with an outside network (e.g., network 105 of FIG. 1) thereby allowing governance and integration unit 101 to communicate with other systems, such as database system 104.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, one is not able to know if the social media data is correct and available to every data user as well as to trust that the social media data is delivered efficiently and protected via a unified governance and integration platform.

Figure 3:
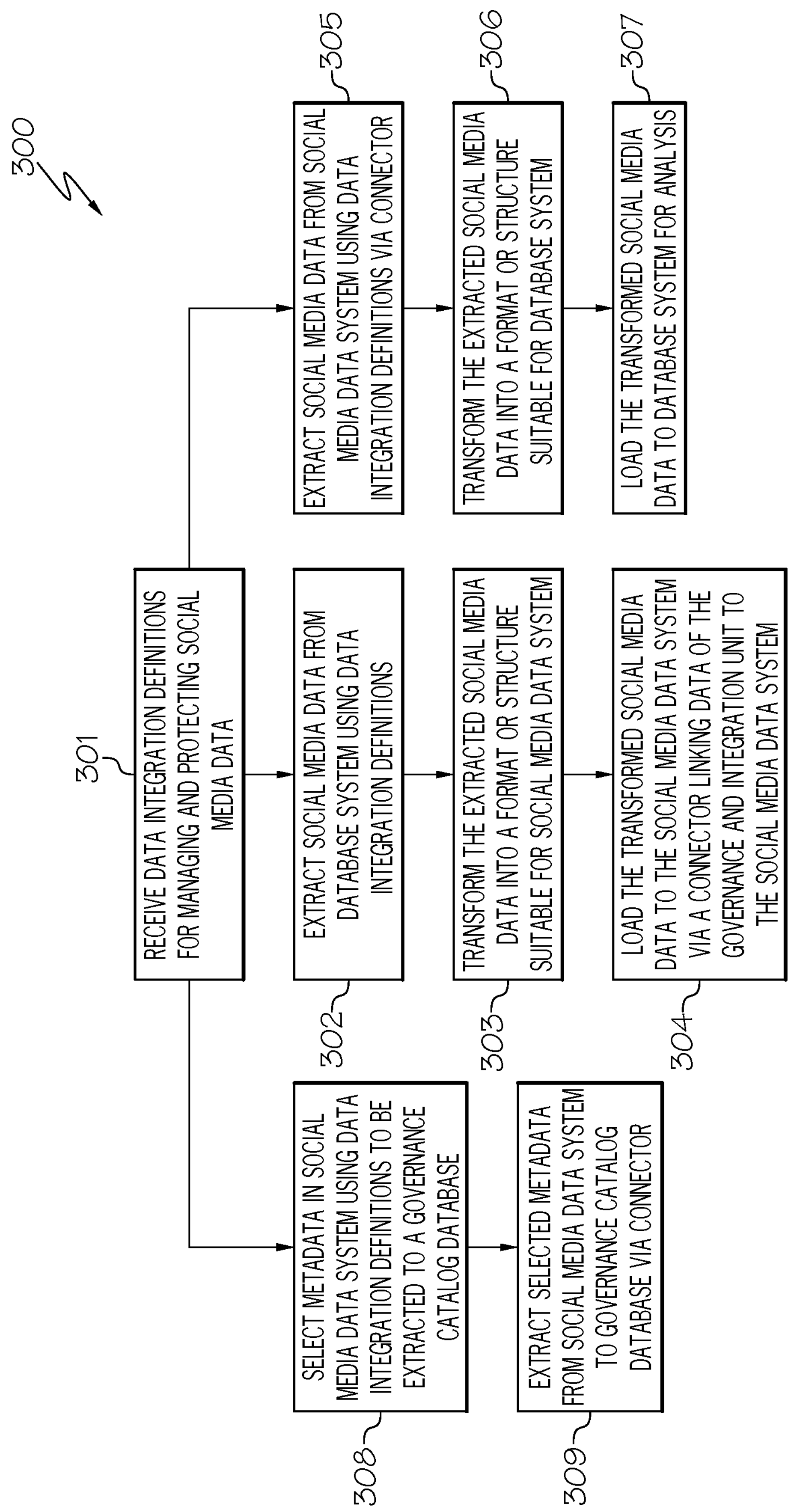
FIG. 3 is a flowchart of a method for applying a unified governance and integration platform to social media data in accordance with an embodiment of the present invention.
Figure 4:
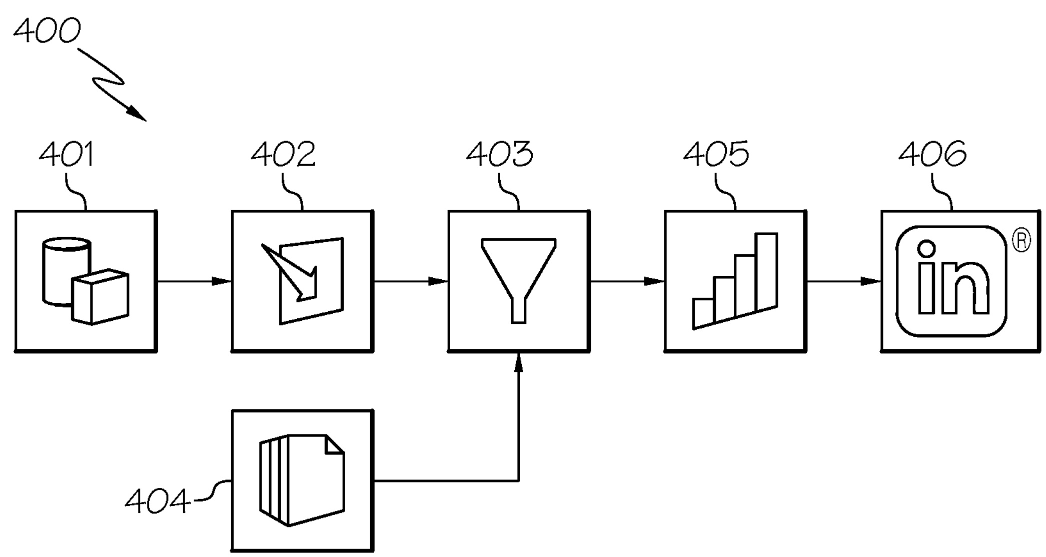
FIG. 4 illustrates extracting data from a database system using the data integration definitions to a social media data system in accordance with an embodiment of the present invention.
Figure 5:
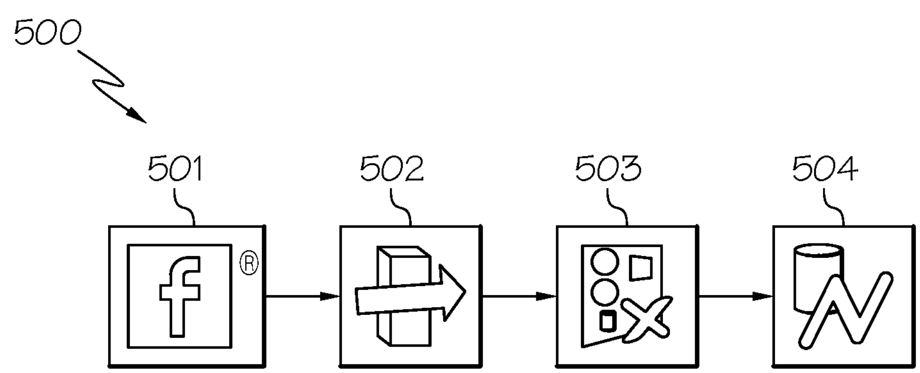
FIG. 5 illustrates extracting data from a social media data system using the data integration definitions to the database system for analysis in accordance with an embodiment of the present invention.
Figure 6:
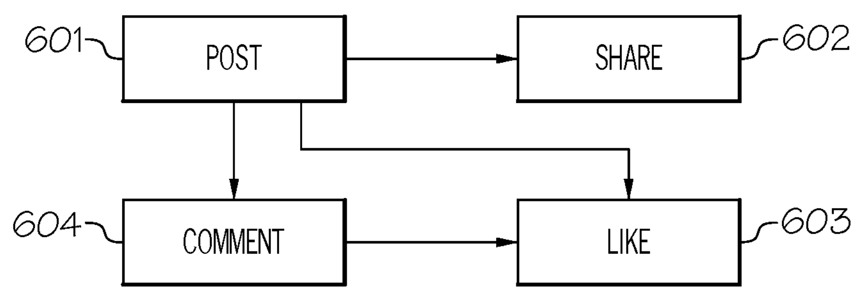
FIG. 6 is an exemplary graphical illustration of the relation between different asset types for social media data based on the data integration definitions in accordance with an embodiment of the present invention.
Figure 7:
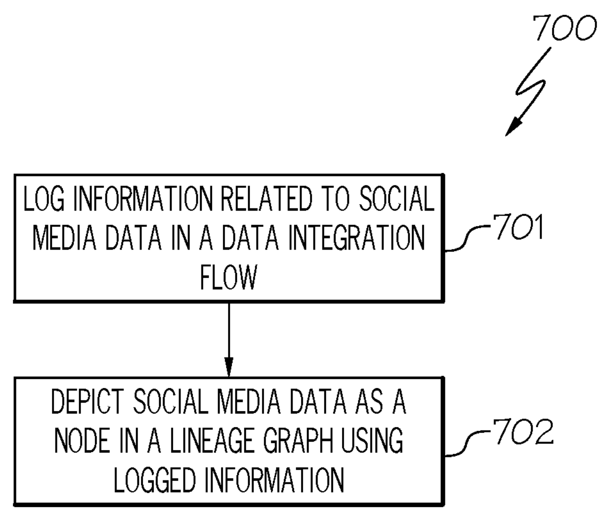
FIG. 7 is a flowchart of a method for utilizing connectors to depict social media metadata in a lineage graph in accordance with an embodiment of the present invention.
Figure 8:
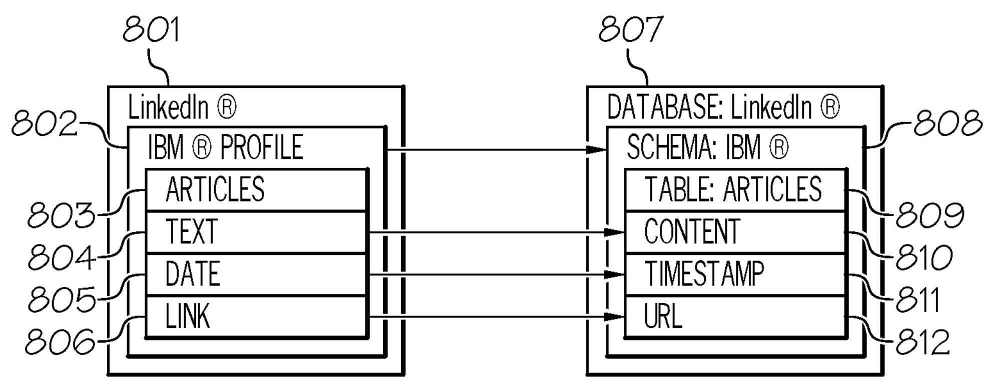
FIG. 8 illustrates lineage visualization by mapping social media concepts to data assets in the governance catalog database in accordance with an embodiment of the present invention.

The embodiments of the present invention provide a means for applying a unified governance and integration platform to social media data thereby enabling one to know if the social media data is correct and available to every data user as well as to trust that the social media data is delivered efficiently and protected as discussed below in connection with FIGS. 3-8. FIG. 3 is a flowchart of a method for applying a unified governance and integration platform to social media data. FIG. 4 illustrates extracting data from a database system using the data integration definitions to a social media data system. FIG. 5 illustrates extracting data from a social media data system using the data integration definitions to the database system for analysis. FIG. 6 is an exemplary graphical illustration of the relation between different asset types for social media data based on the data integration definitions. FIG. 7 is a flowchart of a method for utilizing connectors to depict social media metadata in a lineage graph. FIG. 8 illustrates lineage visualization by mapping social media concepts to data assets in the governance catalog database.

As stated above, FIG. 3 is a flowchart of a method 300 for applying a unified governance and integration platform to social media data in accordance with an embodiment of the present invention.

Referring to FIG. 3, in conjunction with FIGS. 1-2, in step 301, governance and integration unit 101 receives data integration definitions for managing and protecting social media data. "Data integration definitions," as used herein, refer to the rules for extracting, retrieving and loading social media data using connectors 103 between systems. For example, data integration definitions are used to define which company profile is to be used for importing social media data into a social media data system 102. Furthermore, data integration definitions, as used herein, refer to the rules for recording and looking up social media data. Such data integration definitions are used to minimize risks, establish internal rules for data use, implement compliance requirements, improve internal and external communication, increase the value of data, etc.

In one embodiment, data integration definitions are based on identifying a framework, defining owners of the social media data assets, defining data governance processes (e.g., storage, archival, backup, security, etc.), identifying regulatory mandates, and defining controls and audit procedures that ensure compliance. In one embodiment, such rules are determined by one or more users, such as the users of governance and integration unit 101.

After receiving the data integration definitions for social media data, governance and integration unit 101 can govern social media data via a unified governance and integration platform so as to perform data integration externalization, governance catalog externalization or lineage externalization as discussed below.

In step 302, governance and integration unit 101 extracts social media data from database system 104 using the data integration definitions.

In step 303, governance and integration unit 101 transforms the extracted social media data into a format or structure suitable for social media data system 102. "Transformation," as used herein, refers to the process of converting social media data from one format or structure into another format or structure. In one embodiment, such transformations are accomplished by defining how individual fields are mapped, modified, joined, filtered, aggregated, etc. to produce the final desired output. After such data mapping, executable code that will transform the data based on the desired and defined data mapping rules is generated. In one embodiment, such executable code (e.g., AWK) is generated using Extract Transform Load (ETL) code generating tools.

In step 304, governance and integration unit 101 loads the transformed social media data to social media data system 102 via a connector 103 linking the data of governance and integration unit 101 to social media data system 102. In one embodiment, such social media data is applied to social media data system 102 in a data integration flow, which is discussed further below.

The selection of social media data from database system 104 to be applied to social media data system 102 as discussed above in connection with steps 302-304 is illustrated in FIG. 4, which is discussed further below.

In one embodiment, the data integration definitions may include rules determining which social media data (e.g., posts from a user's designated profile) is to be extracted from database system 104 which is to be applied to social media data system 102. In one embodiment, governance and integration unit 101 may be programmed to perform such a function via a user (e.g., user of governance and integration unit 101) selecting various graphical icons in a graphical environment displayed on a user interface of governance and integration unit 101 as shown in FIG. 4.

FIG. 4 illustrates extracting data from a database system (database system 104 of FIG. 1) using the data integration definitions to a social media data system (social media data system 102 of FIG. 1) in accordance with an embodiment of the present invention.

Referring to FIG. 4, in conjunction with FIG. 1, FIG. 4 illustrates a graphical environment 400 (e.g., graphical environment of a data flow diagram) that displays the flow of graphical icons selected by a user illustrating the steps to enable automatic publication of new posts based on the selected social media data in database system 104. For example, a user (e.g., user of governance and integration unit 101) may select icon 401 representing a relational database management system in which social media data is extracted from database system 104 (see icon 402) and filtered (see icon 403) using the data integration definitions. Furthermore, as shown in FIG. 4, the data of a file (see icon 404) is combined with the filtered data from the database. Afterwards, the combined data is sorted (see icon 405) and then published on a social network (e.g., LinkedIn®) (see icon 406).

Returning to FIG. 3, in conjunction with FIGS. 1-2 and 4, alternatively, in step 305, governance and integration unit 101 extracts the social media data from social media data system 102 using the data integration definitions, such as via connector 103. Such social media data is to be extracted to database system 104 for analysis.

In step 306, governance and integration unit 101 transforms the extracted social media data into a format or structure suitable for database system 104.

In step 307, governance and integration unit 101 loads the transformed social media data to database system 104 for analysis, such as via network 105. In one embodiment, such social media data is extracted to database system 104 in a data integration flow, which is discussed further below.

The selection of social media data in social media data system 102 to be extracted to database system 104 as discussed above in connection with steps 305-307 is illustrated in FIG. 5, which is discussed further below.

FIG. 5 illustrates extracting data from a social media data system (social media data system 102 of FIG. 1) using the data integration definitions to the database system (database system 104 of FIG. 1) for analysis in accordance with an embodiment of the present invention.

Referring to FIG. 5, in conjunction with FIG. 1, FIG. 5 illustrates a graphical environment 500 (e.g., graphical environment of a data flow diagram) that displays the flow of graphical icons selected by a user illustrating the steps to enable automatic storing of comments from social media data system 102 (e.g., social network system of Facebook®) to database system 104. For example, a user (e.g., user of governance and integration unit 101) may indicate to retrieve social media comments using the data integration definitions by selecting icon 501 representing the social media data system 102 (e.g., social network system of Facebook®) upon which comments are retrieved. In one embodiment, such data integration definitions may indicate which social media comments are to be retrieved, such as comments posted on a particular user's news feed. In a further example, the data integration definitions may specify the topic of comments that are to be retrieved, in which natural language processing is used by governance and integration unit 101 to identify and extract those comments pertaining to a user-designated topic. For instance, the data integration rules may indicate that all social media comments directed to traveling are to be extracted from social media data system 102. As a result, governance and integration unit 101 may search and identify any comments posted on a user's designated news feed that contain words, such as "travel," and "traveling."

Additionally, as shown in FIG. 5, the user may clean the extracted comments (see icon 502) and remove any duplicates (see icon 503) before extracting the selected social media data to database system 104 (see icon 504).

Returning to FIG. 3, in conjunction with FIGS. 1-2 and 4-5, alternatively, in step 308, governance and integration unit 101 selects the metadata in social media data system 102 using the data integration definitions to be extracted to governance catalog database 106. In one embodiment, the metadata is retrieved using InfoSphere® metadata assets manager. In one embodiment, such importation of the metadata is implemented at the connector level.

"Metadata," as used herein, refers to data that describes the social media data, such as information about a web site and its content. In another example, metadata may include the time of a user posting the social media content or the name of the user posting the social media content. Furthermore, as discussed above, "governance catalog database 106," as used herein, refers to a data structure storing dedicated asset types of social media data, such as page, post, article, endorsement, comment, reaction (e.g., like, +, etc.) and shares, along with its associated social media data.

In step 309, governance and integration unit 101 extracts the selected metadata from social media data system 102 to governance catalog database 106 via connector 103.

In one embodiment, the cataloged social media data artifacts can be presented as dedicated asset types, such as page, post, article, endorsement, comment, reaction (e.g., like, +, etc.) and shares.

In one embodiment, the relationship between such asset types may be determined by the data integration definitions, where the definitions indicate how different asset types are related, such as shown in FIG. 6.

FIG. 6 is an exemplary graphical illustration of the relation between different asset types for social media data based on the data integration definitions in accordance with an embodiment of the present invention.

Referring to FIG. 6, asset type "post" 601 is related to the asset types of "share" 602, "like" 603 and "comment" 604. Furthermore, as shown in FIG. 6, the asset type of "comment" 604 is related to the asset type of "like" 603.

In addition to using the data integration definitions for extracting, retrieving and loading social media data using connectors 103 between systems, connectors 103 may be used for lineage reporting as discussed below in connection with FIGS. 7 and 8.

FIG. 7 is a flowchart of a method 700 for utilizing connectors 103 (FIG. 1) to depict social media metadata in a lineage graph in accordance with an embodiment of the present invention.

Referring to FIG. 7, in conjunction with FIGS. 1-6, in step 701, governance and integration unit 101 logs information related to social media data in a data integration flow using connector 103. A "data integration flow," as used herein refers to a pipeline of data (e.g., oneway, batch process) implemented by extract-transform-load (ETL) tools. Such pipelined data includes various types of data, such as social media data and non-social media data, that are combined or integrated in a flow of data. Such social media data may be identified based on the metadata associated with the data in the data integration flow. Once identified, governance and integration unit 101 logs data lineage information related to the social media data, such as the data origin, movements, characteristics and quality. Such information may be found in the metadata of the social media data. For example, governance and integration unit 101 analyzes the metadata of the social media data as it travels along the data integration flow to provide an understanding and validation of data usage and risks that need to be mitigated.

In step 702, governance and integration unit 101 depicts the social media data as a node in a lineage graph using the logged information.

In one embodiment, in connection with depicting the social media data as a node in a lineage graph, the social media concepts are mapped to data assets in governance catalog database 106 to enable better visualization of lineage.

For example, FIG. 8 illustrates lineage visualization by mapping social media concepts to data assets in the governance catalog (governance catalog database 106 of FIG. 1) in accordance with an embodiment of the present invention.

As shown in FIG. 8, social media concepts 801 for a social media data system 102 (e.g., Linkedin®), such as IBM® Profile 802, articles 803, text 804, date 805 and link 806, are mapped to data assets in a governance catalog 807 (e.g., governance catalog database 106) in a database system 104 (e.g., database: Linkedin®), such as schema: IBM® 808, table: articles 809, content 810, timestamp 811 and URL (Uniform Resource Locator) 812, respectively.

As a result of the present invention, a unified governance and integration platform is applied to social media data thereby obtaining a full lineage of data related to social media. Furthermore, there is now an automatic application of governing policies to social media data. Additionally, all the present data governance capability is now available for social media governance.

Furthermore, as a result of governing social media data via a unified governance and integration platform and utilizing connectors, data loading, data extraction, metadata extraction, data lookup and data lineage reporting as discussed above, are now enabled.

Additionally, as a result of governing social media data via a unified governance and integration platform, data quality discipline is enabled for the social media data system.

Furthermore, as a result of the present invention, a unified governance and integration platform is applied to social media data thereby enabling one to know if the social media data is correct and available to every data user as well as to trust that the social media data is delivered efficiently and protected.

Furthermore, the present invention improves the technology or technical field involving social media data governance. As discussed above, currently, social media data (data from social networks) can be governed if the social media data is already represented in the form of files. However, not all aspects of social media data are currently governed, such as via a unified governance and integration platform. For example, the process of publishing posts based on analytics or importing data from a profile is beyond the current unified governance and integration tools. Hence, data governance which promises to provide a holistic view on all the data assets is not currently available for social media data. As a result, one is not able to know if the social media data is correct and available to every data user as well as to trust that the social media data is delivered efficiently and protected via a unified governance and integration platform.

The present invention improves such technology by receiving data integration definitions for managing and protecting social media data. "Data integration definitions," as used herein, refer to the rules for extracting, retrieving and loading social media data using connectors between systems. For example, data integration definitions are used to define which company profile is to be used for importing social media data into a social media data system. Furthermore, data integration definitions, as used herein, refer to the rules for recording and looking up social media data. Such data integration definitions are used to minimize risks, establish internal rules for data use, implement compliance requirements, improve internal and external communication, increase the value of data, etc. After receiving the data integration definitions for social media data, data integration externalization, governance catalog externalization or lineage externalization may be performed. For example, the social media data may be extracted from a database system by a governance and integration unit using the data integration definitions. The extracted social media data is then transformed and loaded to the social media data system via a connector linking the data from the governance and integration unit to the social media data system. In another example, social media data is extracted from the social media data system, such as via the connector, using the data integration definitions by the governance and integration unit. The extracted social media data is then transformed and loaded to the database system for analysis. In this manner, a unified governance and integration platform is applied to social media data thereby enabling one to know if the social media data is correct and available to every data user as well as to trust that the social media data is delivered efficiently and protected. Additionally, in this manner, there is an improvement in the technical field involving social media data governance.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for applying a unified governance and integration platform to social media data, the method comprising:

receiving data integration definitions for managing and protecting social media data;

extracting a first set of social media data in a database system using said data integration definitions;

transforming said first set of extracted social media data into a format suitable for a social media data system;

loading said transformed first set of social media data to said social media data system via a connector linking data to said social media data system;

extracting a second set of social media data from said social media data system using said data integration definitions via said connector;

transforming said second set of extracted social media data into a format suitable for said database system; and loading said transformed second set of social media data to said database system.

2. The method as recited in claim 1 further comprising:

selecting metadata in said social media data system using said data integration definitions to be extracted to a governance catalog database; and extracting said selected metadata from said social media data system to said governance catalog database via said connector.

3. The method as recited in claim 1 further comprising:

logging information related to social media data in a data integration flow using said connector.

4. The method as recited in claim 3, wherein a first social media data is depicted as a node in a lineage graph using said logged information.

5. The method as recited in claim 1, wherein said social media data comprises information regarding how users view, share and engage with content and profiles.

6. The method as recited in claim 1, wherein said social media data is a data source in a governance catalog database assigned one of the following asset types: page, post, article, endorsement, comment, reaction and shares.

7. The method as recited in claim 1, wherein said connector is configured to retrieve metadata, extract data, load data, record lineage and lookup data.

8. A computer program product for applying a unified governance and integration platform to social media data, the computer program product comprising one or more computer readable storage mediums having program code embodied therewith, the program code comprising the programming instructions for:

receiving data integration definitions for managing and protecting social media data;

extracting a first set of social media data in a database system using said data integration definitions;

transforming said first set of extracted social media data into a format suitable for a social media data system;

loading said transformed first set of social media data to said social media data system via a connector linking data to said social media data system;

extracting a second set of social media data from said social media data system using said data integration definitions via said connector;

transforming said second set of extracted social media data into a format suitable for said database system; and loading said transformed second set of social media data to said database system.

9. The computer program product as recited in claim 8, wherein the program code further comprises the programming instructions for:

selecting metadata in said social media data system using said data integration definitions to be extracted to a governance catalog database; and extracting said selected metadata from said social media data system to said governance catalog database via said connector.

10. The computer program product as recited in claim 8, wherein the program code further comprises the programming instructions for:

logging information related to social media data in a data integration flow using said connector.

11. The computer program product as recited in claim 10, wherein a first social media data is depicted as a node in a lineage graph using said logged information.

12. The computer program product as recited in claim 8, wherein said social media data comprises information regarding how users view, share and engage with content and profiles.

13. The computer program product as recited in claim 8, wherein said social media data is a data source in a governance catalog database assigned one of the following asset types: page, post, article, endorsement, comment, reaction and shares.

14. The computer program product as recited in claim 8, wherein said connector is configured to retrieve metadata, extract data, load data, record lineage and lookup data.

15. A system, comprising:

a memory for storing a computer program for applying a unified governance and integration platform to social media data; and a processor connected to said memory, wherein said processor is configured to execute the program instructions of the computer program comprising:

receiving data integration definitions for managing and protecting social media data;

extracting a first set of social media data in a database system using said data integration definitions;

transforming said first set of extracted social media data into a format suitable for a social media data system;

loading said transformed first set of social media data to said social media data system via a connector linking data to said social media data system;

extracting a second set of social media data from said social media data system using said data integration definitions via said connector;

transforming said second set of extracted social media data into a format suitable for said database system; and loading said transformed second set of social media data to said database system.

16. The system as recited in claim 15, wherein the program instructions of the computer program further comprise:

selecting metadata in said social media data system using said data integration definitions to be extracted to a governance catalog database; and extracting said selected metadata from said social media data system to said governance catalog database via said connector.

17. The system as recited in claim 15, wherein the program instructions of the computer program further comprise:

logging information related to social media data in a data integration flow using said connector.

18. The system as recited in claim 17, wherein a first social media data is depicted as a node in a lineage graph using said logged information.

19. The system as recited in claim 15, wherein said social media data comprises information regarding how users view, share and engage with content and profiles.

20. The system as recited in claim 15, wherein said social media data is a data source in a governance catalog database assigned one of the following asset types: page, post, article, endorsement, comment, reaction and shares.

* * * * *